United States Patent
Kato et al.

[11] Patent Number: 5,803,552
[45] Date of Patent: Sep. 8, 1998

[54] ALUMINUM WHEEL

[75] Inventors: Tadayoshi Kato; Atsushi Mizutani; Takashi Ichikawa, all of Aichi-ken, Japan

[73] Assignee: Kabushiki Kaisha Tokai Rika Denki Seisakusho, Aichi-ken, Japan

[21] Appl. No.: 747,660

[22] Filed: Nov. 13, 1996

[30] Foreign Application Priority Data

Nov. 13, 1995 [JP] Japan ................................ 7-294352
Nov. 11, 1996 [JP] Japan ................................ 8-298285

[51] Int. Cl.⁶ ........................................................ B60B 7/06
[52] U.S. Cl. ................................. 301/37.41; 301/37.34
[58] Field of Search ........................... 301/37.1, 37.31, 301/37.34, 37.41, 64.1, 64.2, 65

[56] References Cited

U.S. PATENT DOCUMENTS

| | | | |
|---|---|---|---|
| 1,329,935 | 2/1920 | Smith | 301/37.41 X |
| 1,374,065 | 4/1921 | Diana | 301/37.41 X |
| 1,797,546 | 3/1931 | Clark | 301/37.41 |
| 1,987,223 | 1/1935 | Zerk | 301/37.1 |
| 1,989,839 | 2/1935 | Zeller | 301/37.41 |
| 3,034,833 | 5/1962 | Ares | 301/37.41 |
| 3,051,276 | 8/1962 | Zyon | 301/37.41 X |
| 4,645,268 | 2/1987 | Carlson | 301/65 X |

*Primary Examiner*—Russell D. Stormer
*Attorney, Agent, or Firm*—Birch, Stewart, Kolasch & Birch, LLP

[57] ABSTRACT

A wheel, made of aluminium, for an automobile, including an aluminum body part, and a cover as a design part which is removably fitted to the aluminum body part. The aluminum body part, including a rim part and a disc part, imparts a desired strength to the wheel. The cover has a substantially disc-shaped cover body that covers a front face of the aluminum body part, and fixing means, arranged circumferentially with a spacing therebetween, which is installed on a rear surface of the cover body.

5 Claims, 18 Drawing Sheets

ALUMINUM WHEEL

BACKGROUND OF THE INVENTION

1. Technical Field of the Invention

The present invention relates to an aluminum wheel for an automobile, and particularly relates to the aluminum wheel in which a body part and a design part thereof are provided separately.

2. Description of the Related Arts

An aluminum wheel used for enhancing design property of a wheel part of an automobile is, in many cases, provided as an integral member of aluminum molding (casting). In some other aluminum wheels, a half cap for concealing the mounting bolt part to the wheel shaft is provided in the center. In either case, the body part mounted to the vehicle and the design part thereof are formed as an integral member. On the other hand, since the aluminum wheel is intended to enhance the design property, its design ranges over a wide variety and differs in its tendency depending on the types of vehicles, such as sports cars and touring cars. Besides, the design is highly fashion oriented.

For example, for a design having a plurality of spokes extending from the center toward the rim as shown in FIG. 1, it is practiced to push out the design part of the wheel center toward the front as much as possible with a desire that the spokes look the longest possible. With such an arrangement, however, the spoke part would increase in the wall thickness in the axial direction of the wheel while the rim portions between the spokes also would increase in wall thickness. As a result, the wheel would increase in weight, increasing the burden in the work of mounting the wheel to the vehicle.

Therefore, when the largest preference is placed on weight reduction of the wheel, such a design change would be involved as the portions of wall thickness are lessened, thus the degree of freedom for design being limited.

SUMMARY OF THE INVENTION

Accordingly, one object of the present invention is to provide an aluminum wheel which can be designed at a high degree of freedom, and which can be reduced in weight at all times to a minimum required to give a necessary and sufficient strength thereto.

Another object of the present invention is to manufacture the cover fast and at a low cost, where the aluminum wheel comprises an aluminum body part and a cover which is removably fixed to the aluminum body part.

Still another object of the present invention is to make the fixing means generally applicable to various types of cover bodies, where the cover comprises a cover body and fixing means which is attached to the cover body.

These and other objects of the present invention are realized by providing an aluminum wheel which comprises two components: an aluminum body part which gives a predetermined strength thereto, and a cover as a design part which is removably fitted to the aluminum body part so as to cover its front face. The aluminum body part, which is formed into a cylindrical outer shape including a rim part and a disc part, gives a necessary least strength required for the aluminum wheel. Meanwhile, the cover that covers the front face of the aluminum body part comprises a cover body to which a design, the primary object of the aluminum wheel itself, is implemented, and a plurality of fixing means, arranged in a circumferential direction thereof with a spacing between the fixing means, on the rear face of the cover body so that the cover body can be removably fixed to the aluminum body part. Therefore, the cover body is formed into a "substantially disc-shaped" configuration which covers the front face of the aluminum body part having no design-oriented elements (i.e., the face that is directed outward when the aluminum wheel is mounted to the vehicle, and that is a circular being surrounded by the tire), and an outer peripheral part of the cover body extends up to a proximity to the rim flange part.

As a result of adopting the above construction, it becomes possible to fit the cover, which is a separate member serving as the design part, to the aluminum body part which is provided with a necessary minimum arrangement to give the predetermined strength for a purpose of reduction in weight. That is, since one aluminum body part which is reduced in weight can be used regardless of the design of the cover, the degree of freedom for design is not limited by the weight reduction of the aluminum wheel.

Further, since a plurality of covers can be used for one aluminum body part by replacing one cover with another, the appearance of the aluminum wheel can be easily changed. As the fixing means for removably fixing the cover body to the aluminum body part, it is preferable to use planar fasteners such as Velcro fasteners, various types of clip members or other fitting members, elastically engaging means making use of a protrusion and a bushing, and the like. From the viewpoint of reducing the weight of the whole aluminum wheel, it is preferable to make the cover body of plastic resin or light-weight materials such as magnesium and aluminum.

Generally, in respect of the aluminum wheel, its design is first determined, the details of the design, etc. are modified over consideration of a relation between the actual mounting thereof to vehicles and the necessary strength thereof, and the end product is completed. Accordingly, for the conventional aluminum wheels in which the body part and the design part are formed as an integral member, it takes a relatively long time from the determination of the design to the completion of the manufacturing. On the other hand, according to the aluminum wheel of the present invention in which the body part and the design part are provided as separate members, the cover that serves as the design part is completely independent of the strength of the aluminum wheel or of the mounting portion to the vehicle. Thus, there is a merit that it takes a relatively short time from the determination of the design to the completion of the manufacturing.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
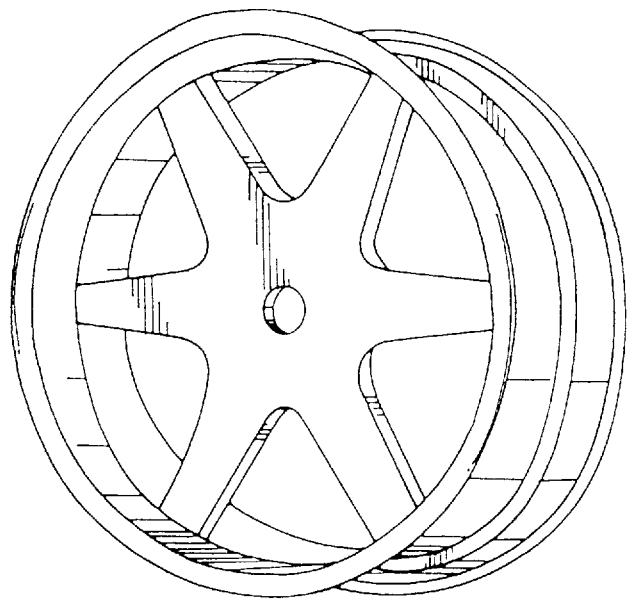
FIG. 1 is a perspective view showing a conventional aluminum wheel in which legs extending from the center toward the rim are provided as the design part.

Before the description of the present invention proceeds, it is to be noted that like parts or corresponding parts are designated by like reference numerals throughout the accompanying drawings.

Figure 2:
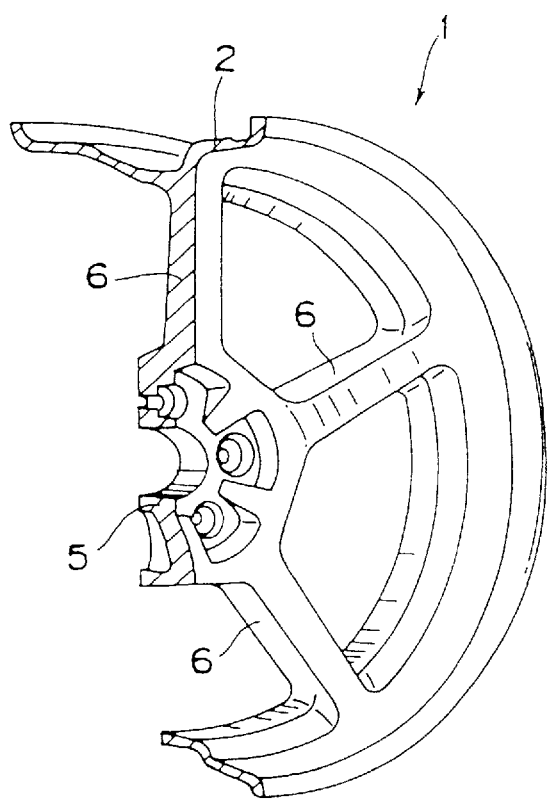
FIG. 2 is a partly broken perspective view showing an aluminum body part of an aluminum wheel of the present invention.

An aluminum wheel of the present invention comprises an aluminum body part and a cover which are separate members. The aluminum body part 1 as shown in FIG. 2, which is a part that gives a strength necessary as an aluminum wheel, is formed into a cylindrical outer shape, having a disc portion and a rim portion 2, where the disc portion comprises a plurality of spokes 6 extending radially from the center toward the rim 2. In the center of the wheel into which the spokes are converged, a mounting part 5 for mounting the wheel onto a vehicle is provided. The number, weight and the like of the spokes 6 that constitute the disc portion are minimized to prevent any increase in the weight of the whole aluminum wheel as well as to impart a necessary strength.

As seen above, the aluminum body part 1, although similar in outer shape to the conventional aluminum wheel in which its design aspect is integrally incorporated, has no design-oriented elements, the arrangement being a minimum enough to impart a necessary strength with unnecessary wall thickness portions eliminated. The aluminum body part 1 is thus reduced in weight to an extreme.

Figure 3:
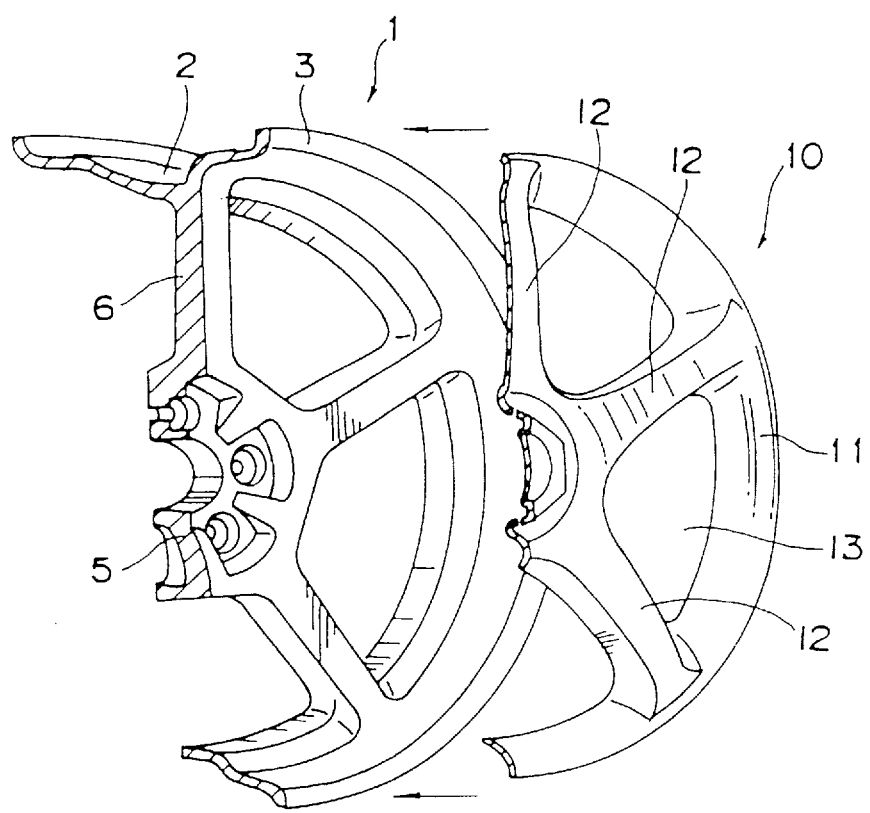
FIG. 3 is a partly broken perspective view showing the aluminum body part of FIG. 2 and a cover body of the cover to be fitted to the aluminum body part.
Figure 4:
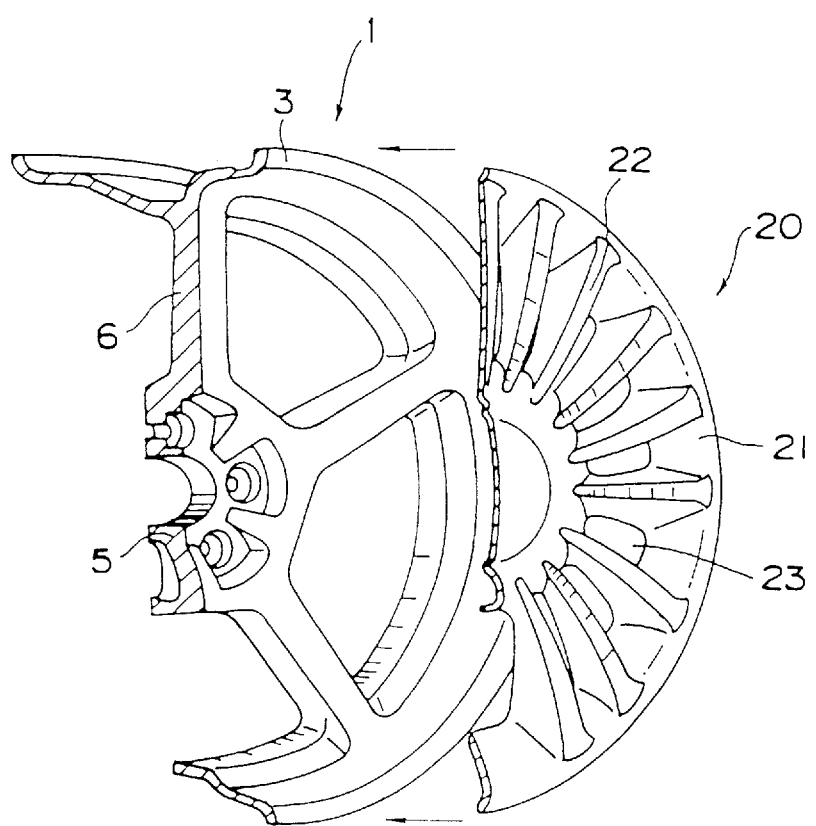
FIG. 4 is a partly broken perspective view showing the aluminum body part of FIG. 2 and a cover body of the cover to be fitted to the aluminum body part.
Figure 5:
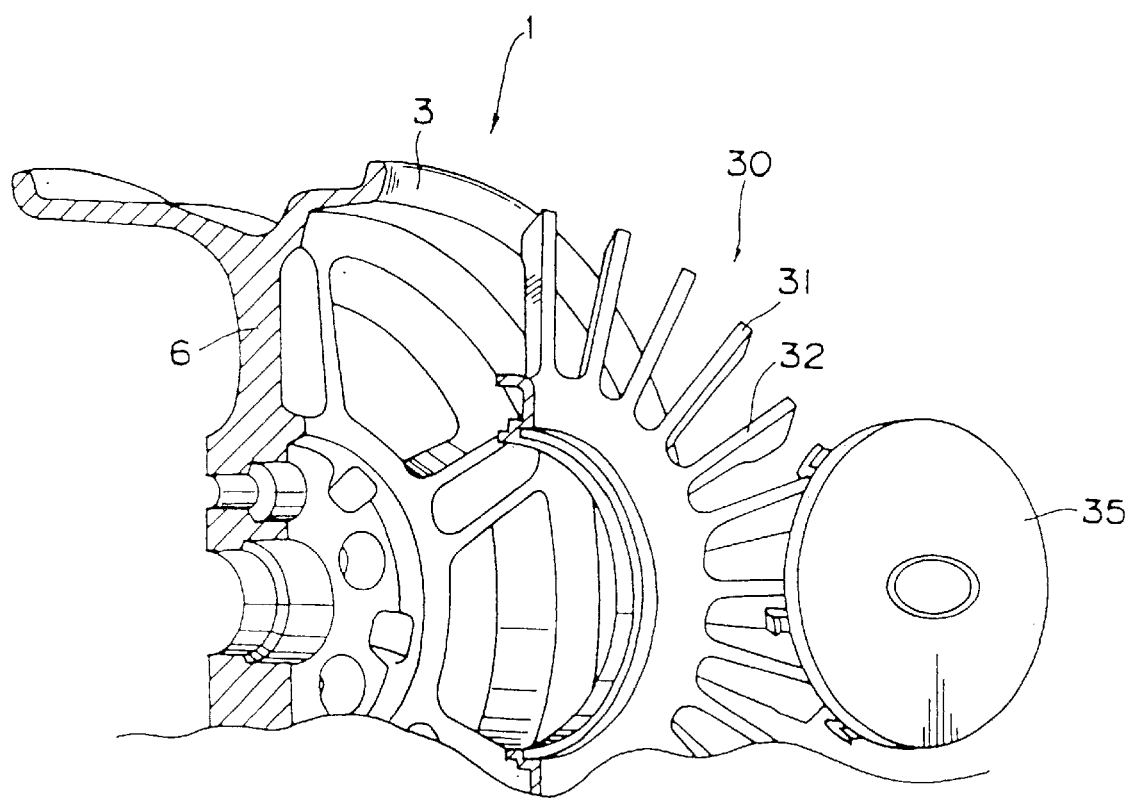
FIG. 5 is a partly broken perspective view showing the aluminum body part of FIG. 2 and a cover body of the cover to be fitted to the aluminum body part.

To this aluminum body part 1, a disc-shaped cover that serves as the design part, which is the primary purpose of the aluminum wheel itself, is removably fitted. The cover comprises a cover body and a fixing means for removably fixing the cover body to the aluminum body. Examples of the cover body are shown in FIGS. 3 to 5. The cover body 10 of FIG. 3 is of a sporty type while the cover body 20 of FIG. 4 is of a luxury type. In either case, a plurality of spokes 12, 22 extending from the center toward the rim, and openings 13, 23 provided between the spokes, are formed as the design part. Also, the cover body 30 of FIG. 5 has an ornament-use half cap 35 provided in the center and is so designed that a plurality of blades 32 extend radially.

The aluminum body part 1 has no design-oriented elements as described above. And, each cover body is formed into a "substantially disc-shaped" configuration which covers the front face of the aluminum body part 1 (i.e., the face that will be directed outward when the aluminum wheel is mounted to the vehicle, and that is a circular face surrounded by the tire), and whose outer peripheral portions 11, 21, 31 extend up to a proximity to the rim flange portion 3. The terms, "substantially disc-shaped", refer to such a disc shape, as a whole, that at least one part of the outer peripheral portion of the cover body extends to a proximity to the rim flange portion. That is, such cover bodies having openings as shown in FIGS. 3 and 4, and such a cover body of a radial shape as shown in FIG. 5 can be said to be substantially disc-shaped.

For the cover body, various designs may be adopted without being limited to those shown in FIGS. 3 to 5, and any arbitrary design, unless it lacks the required least shape-retaining property, may be adopted without taking into consideration its resultant strength. Also, the cover body is preferably molded from plastic resin so as to be reduced in weight. Otherwise, the cover body can be reduced in weight also by making the cover body from magnesium, aluminum, or the like.

As the fixing means for fitting the cover body to the aluminum body part 1, screw locking means such as bolts may be adopted, but planar fasteners such as Velcro fasteners are preferably used. This is because the planar fasteners, when used, do not need to form screw holes in the cover body and are therefore superior in manufacturing process and design property, and because the planar fasteners, which make it easier to fit and remove the cover thereto, allow an easy design change of the aluminum wheel by replacing the cover with another. This is preferable from the viewpoint of improvement in the design property, which is the original purpose of the aluminum wheel itself.

As a planar fastener other than the Velcro fastener, a so-called dual-lock fastener, which is composed of two planar members provided with "mushroom-like protrusions" densely gathered and elastically deformable may also be used, in which case similar effects can still be obtained. When the planar members are pressed against each other while the "mushroom-like protrusions" formed thereon are kept in contact with each other, the heads of the "mushroom-like protrusions" are engaged with each other, by which the planar members are engaged with each other. These members can be disengaged from each other by applying a certain degree of external force, so that the planar members can be iteratively mated and unmated.

Figure 6:
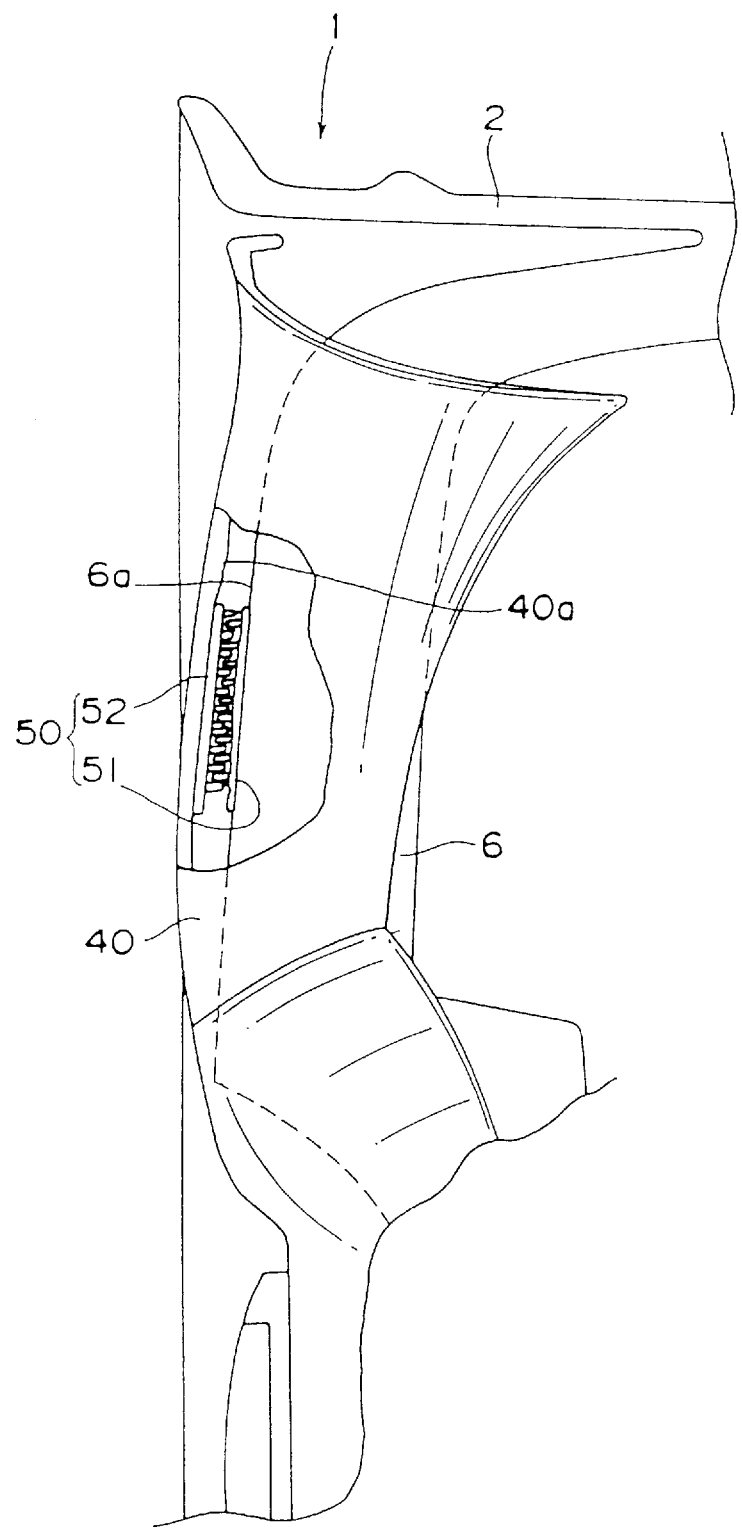
FIG. 6 is a partly perspective view showing a state in which the cover is fitted to the aluminum body with a dual lock fastener employed as the fixing means.

FIG. 6 shows an example in which, with a dual lock fastener 50 employed as the fixing means, a cover body 40 is fitted to the aluminum body part 1. The dual lock fastener 50 comprises two planar members 51 and 52. One planar member 51 is fixed to a spoke surface 6a by using adhesive or the like. The other planar member 52 is fixed to the corresponding position of a cover-body rear surface 40a also by using adhesive or the like. Although one dual lock fastener is shown in FIG. 6, a plurality of dual lock fasteners are actually arranged circumferentially with spacings on the rear surface of the cover body. That is, the planar members are attached to all the spokes (or any arbitrary number of spokes, depending on the number of spokes) and to the corresponding positions of the cover rear face.

Whereas FIG. 6 shows a case where a dual lock fastener is employed as the fixing means for removably fixing the cover body to the aluminum body part 1, other various forms of fixing means may also be adopted. When a planar fastener such as a dual lock fastener is used, the disc portion of the aluminum body part may be formed from a thin plate shape other than spokes.

Below described are various covers which are particularly useful when an aluminum body part with the disc portion formed from a plurality of spokes 6 extending radially is adopted as shown in FIG. 2. In all the examples presented below, the fixing means equipped on the cover is so arranged as to be engageable with the spokes of the disc portion. Besides, because the aluminum body part allows the spokes to be identical in configuration even with different inch measures (different diameters), the fixing means can be applied for general-purpose use to aluminum body parts and covers of different sizes. The fixing means, as in the case of the dual lock fastener of FIG. 6, fulfill their function with a plurality thereof being arranged circumferentially with spacings on the rear face side of the cover body.

Also, in all the examples described below, the cover body of the cover can be made at a low cost by vacuum molding of sheet material or by injection molding. In particular, when the injection molding is involved, the configuration of the cover body is so determined that only upper and lower molding dies do as the molding dies to be used. That is, since neither slide dies nor cores that move sideways are required, the cost relating to the molding dies can be reduced while the scheduled term of their manufacture can be shortened. Also, responsive to the non-use of any slide die, the time required for the mold release after the injection molding is shortened so that the molding cycle of the cover body can be shortened.

Figure 7:
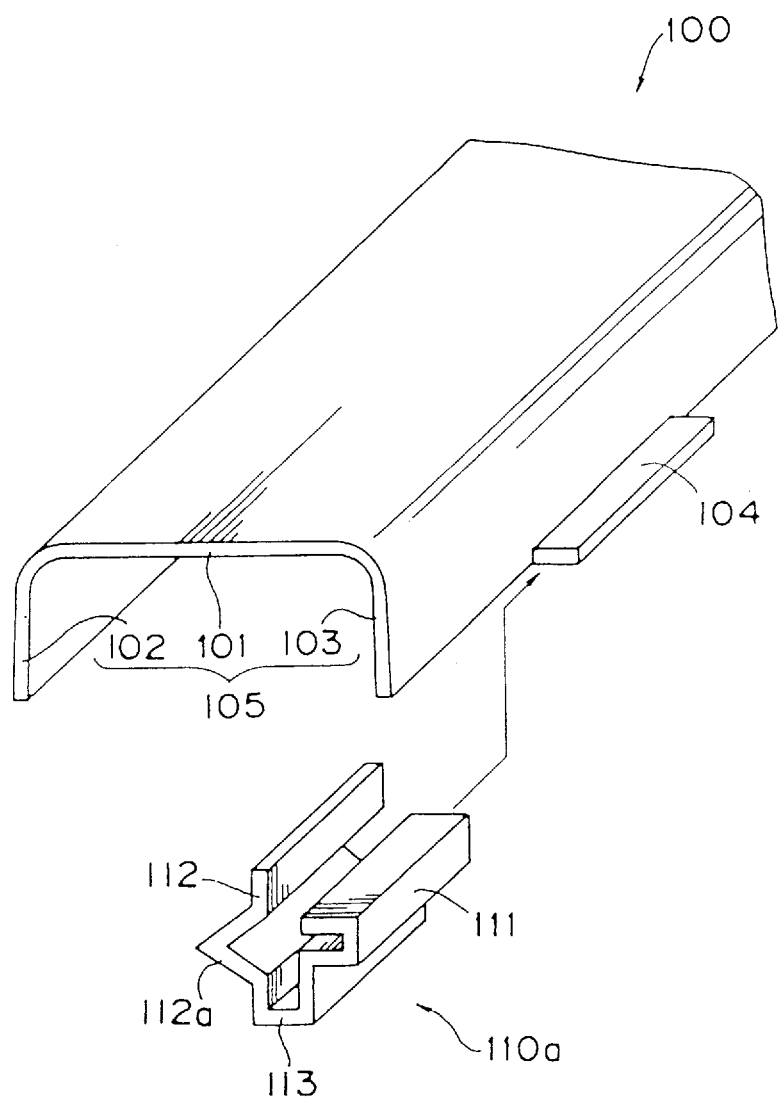
FIG. 7 is a perspective view for explaining a case where a fitting clip is employed as the fixing means.
Figure 8:
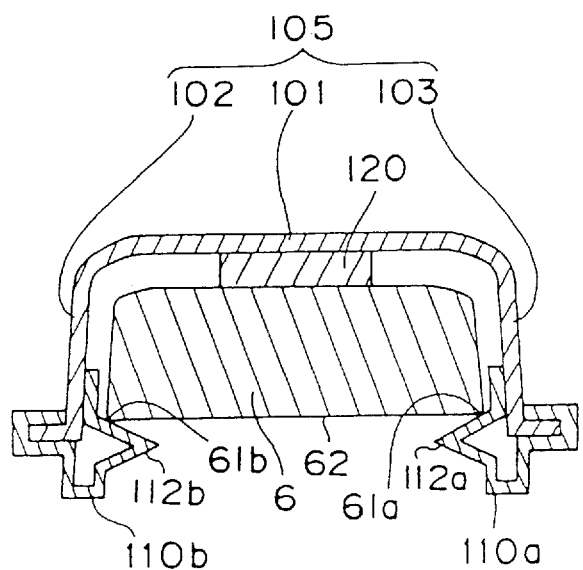
FIG. 8 is a cross-sectional view of the spoke of the cover body shown in FIG. 7, as cut in a direction perpendicular to the longitudinal direction of the spoke, where a spoke of the aluminum body part is also shown in combination.

In the example shown in FIGS. 7 and 8, a cover body 100 is similar to the cover body 10 of the sporty type shown in FIG. 3, where FIG. 7 shows only a spoke 105 corresponding to the spoke 12 of the cover body 10. Also, FIG. 8 shows a cross section perpendicular to the longitudinal axis of the spoke 105, where the spoke 6 of the aluminum body part 1 is shown in combination.

The spoke 105 of the cover body 100 comprises a top wall 101, and left and right side walls 102 and 103 hanging down from both sides of the top wall 101. That is, the spoke 105 is formed into a general U-shape in cross section that is bent so as to cover the top surface and both side surfaces of the spoke 6 of the aluminum body part 1.

The fixing means for fixing the cover body 100 to the aluminum body part 1 comprises an elastic member 120 pinched in compressed state between the rear surface of the top wall 101 and the surface of the spoke, and a pair of fitting clip pieces 110a, 110b that support the spoke 6 against the elastic force due to the elastic member from the opposite side.

Each clip piece 110a, which is made of plastic resin or metal plate, comprises a pinching portion 111 and an engaging portion 112. The pinching portion 111 elastically pinches a protruding blade 104 formed at an end of the side wall 103 of the spoke. The engaging portion 112, which extends axially of the wheel (i.e., in the direction along which the side wall 103 extends), has an elastic engaging projection 112a. It is to be noted that the pinching portion 111 and the engaging portion 112 are coupled with each other by a coupling portion 113.

The clip piece 110a is fitted to the spoke 105 (i.e., to the cover body 100) by the pinching portion 111 pinching the protruding blade 104. As shown in FIG. 8, the similar clip piece 110b is fitted also to the other side wall 102 opposite to the side wall 103.

As described above, between the rear surface of the top wall 101 of the spoke 105, and the spoke surface, the elastic member 120 is placed in compressed state, pressing and urging the spoke 6 downward as viewed in FIG. 8. Meanwhile, the elastic engaging projections 112a and 112b of the clip pieces 110a and 110b fixed to the side walls 102 and 103 of the spoke 105 support the spoke 6 against the elastic force due to the elastic member 120 from the opposite side and at lower corners 61a and 61b of the spoke 6. As a result, the spoke 6 is pinched in three directions by the elastic member 120 and the elastic engaging projections 112a, 112b of the clip pieces, by which the cover body 100 is fixed to the aluminum body part 1.

Figure 9:
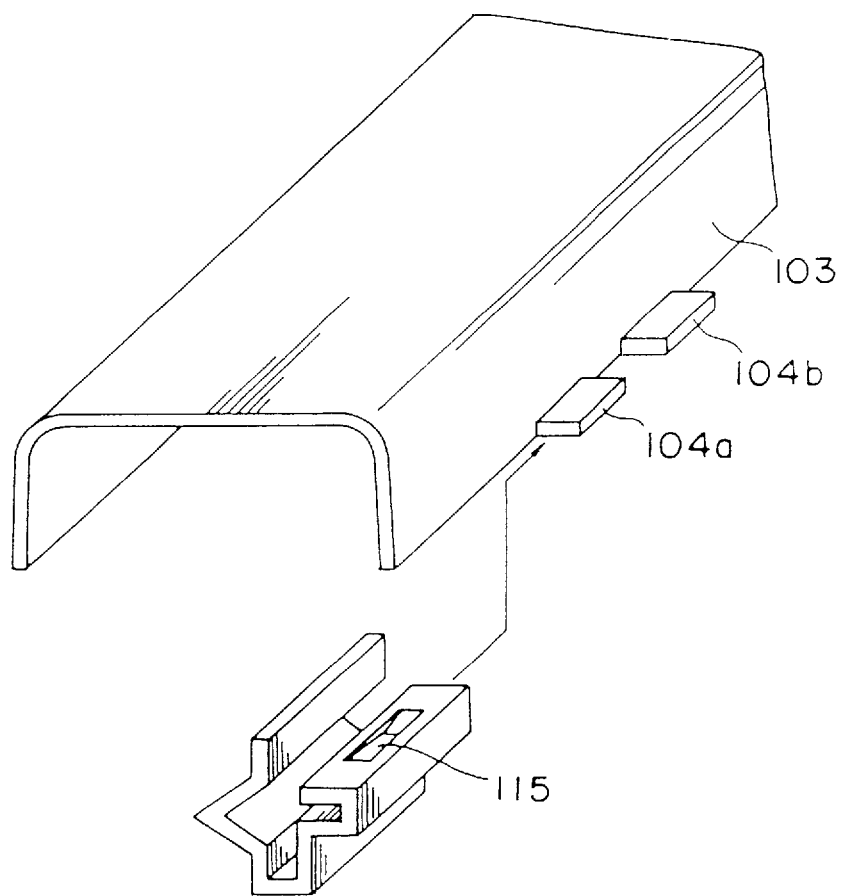
FIG. 9 is a perspective view for explaining a modification example of the fitting clip shown in FIG. 7.

Whereas the pinching portion of each clip piece is intended to pinch the protruding blade 104 formed on the side wall of the spoke, a positioning means is preferably provided at the pinching portion in order to prevent the pinching portion from sliding along the protruding blade 104. The positioning means is preferably a positioning piece 115 formed by cutting and raising a part of the pinching portion downward, as shown in FIG. 9. In this case, the protruding blade formed on the side wall 103 of the spoke is divided into two portions 104a and 104b, and the positioning piece 115 engages between the two portions. Another positioning means may be such an arrangement that a projection is formed instead of the positioning piece 115 while the protruding blade 104 partly has a recessed portion or hole into which the projection is fitted.

With the above arrangement, the clip pieces are prevented from sliding along the lengthwise direction of the spoke.

The actual fitting operation of the cover to the aluminum body part 1 is carried out in the following way. First, the clip pieces 110a and 110b are fixed to the side walls of the spoke 105, by which the cover body and the clip pieces are connected to each together to make up the cover. Next, the cover is pressed against the aluminum body part 1 from above. Then, the elastic engaging projection of each clip piece is elastically deformed into an almost linear state by the spoke 6 of the aluminum body part 1. Further, with the cover continuously kept pressed against the aluminum body part 1, the elastic engaging projection reaches the rear surface side 62 of the spoke 6 so that its configuration is restored. The resulting state is shown in FIG. 8. By the operation reverse to the above operation, the cover can be removed from the aluminum body part 1.

Figure 10:
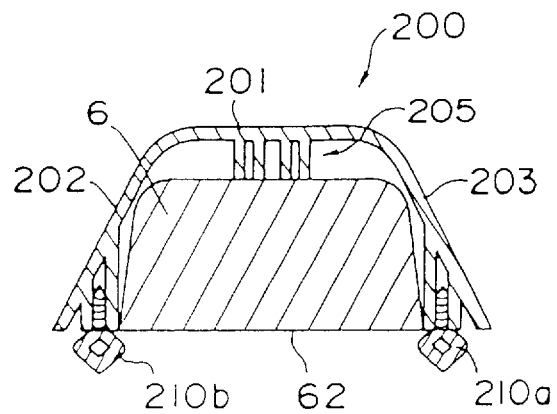
FIG. 10 is a cross-sectional view, corresponding to FIG. 8, for explaining a case where another fitting clip is employed as the fixing means.
Figure 11:
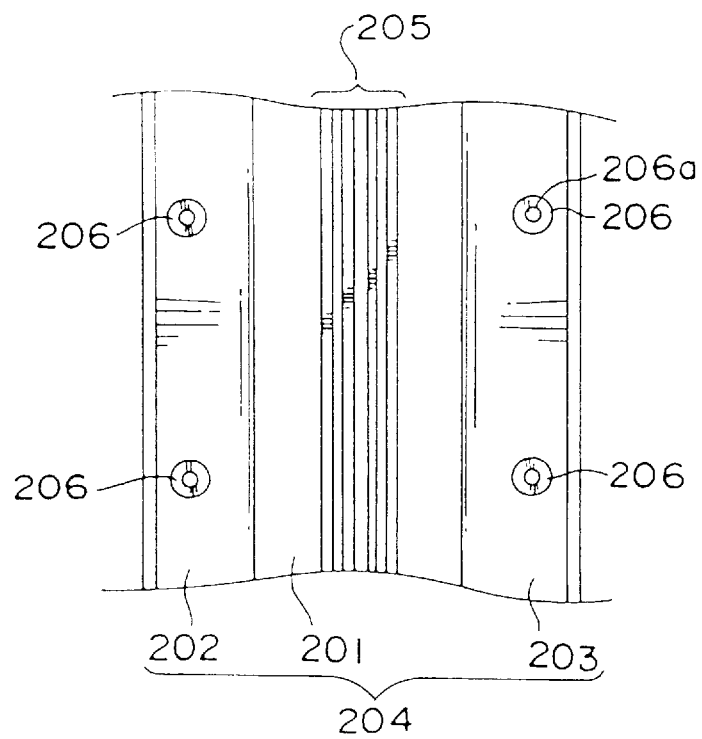
FIG. 11 is a view of the spoke of the cover body shown in FIG. 10, as viewed from below, where the spoke of the aluminum body part is omitted.

In the example shown in FIGS. 10 and 11, a cover body 200 is similar to the cover body 10 of the sporty type shown in FIG. 3. FIG. 10 is a cross-sectional view corresponding to FIG. 8. FIG. 11 is a view of the spoke of FIG. 10 as viewed from below, where the spoke 6 is omitted.

A spoke 204 of the cover body 200 comprises a top wall 201, and left and right side walls 202 and 203 obliquely hanging down from both sides of the top wall 201. That is, the spoke 204 is formed into a general U-shape in cross section that is bent so as to cover the top surface and both side surfaces of the spoke 6 of the aluminum body part 1.

Bosses 206 are provided so as to extend from positions near end portions of the rear surfaces of the side walls 202 and 203, generally perpendicularly to the top wall 201. A plurality of bosses 206 are formed on both side walls with a spacing therebetween along the lengthwise direction of the spoke, and located at such positions that the bosses formed on the respective side walls are opposed to their respectively corresponding ones. Each boss has a hole 206a to be engaged with an engaging portion 212 of the fitting clip piece which will be described later.

The fixing means for fixing the cover body 200 to the aluminum body part 1 comprises an elastic projection 205 formed on the rear surface of the top wall 201, and a pair of fitting clip pieces 210a, 210b that support the spoke 6 against the elastic force due to the elastic projection from the opposite side.

The elastic projection 205 is constituted by a plurality of plate-shaped members which are provided on the rear side of the top wall 201 so as to extend in parallel to its longitudinal direction.

Figure 12:
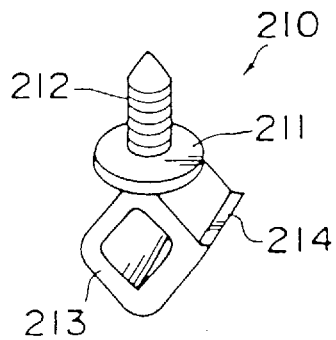
FIG. 12 is a perspective view showing the fitting clip shown in FIG. 10.

Each clip piece 210, which is a member having a screw portion 212 and an elastic engaging portion 213 on both sides of a circular-shaped base 211 as shown in FIG. 12, is integrally molded from plastic resin. The screw portion 212 is screwed and engaged in the hole 206a of the boss formed on the rear surface side of the side walls 202 and 203. The elastic engaging portion 213, which is an elastically deformable, generally cylindrical member, is coupled to the base 211 at part of its peripheral surface. The elastic engaging portion 213 has an engaging surface 214 to be engaged with the rear surface 62 of the spoke.

In the fitted state as shown in FIG. 10, the elastic projection 205 formed on the rear surface of the top wall 201 of the spoke presses and urges the spoke downward, as viewed in FIG. 10. Meanwhile, the engaging surfaces 214 of the clip pieces 210a and 210b fixed to the side walls 202 and 203 of the spoke support the spoke 6 against the elastic force due to the elastic projection 205 from the opposite side at lower corners 61a and 61b of the spoke 6. As a result, the spoke 6 is pinched in three directions by the elastic projection 205 and the engaging surfaces of the clip pieces, by which the cover body 200 is fixed to the aluminum body part 1.

Figure 13:
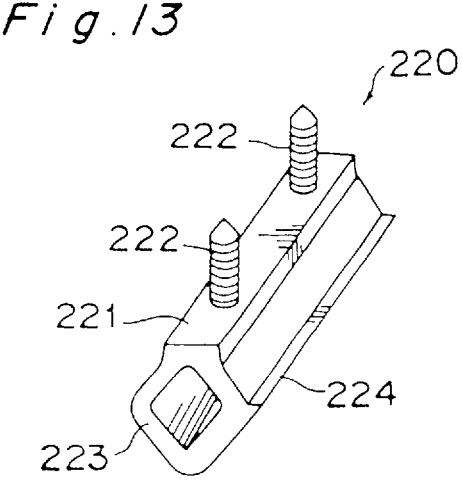
FIG. 13 is a perspective view showing a modification example of the fitting clip shown in FIG. 12.
Figure 14:
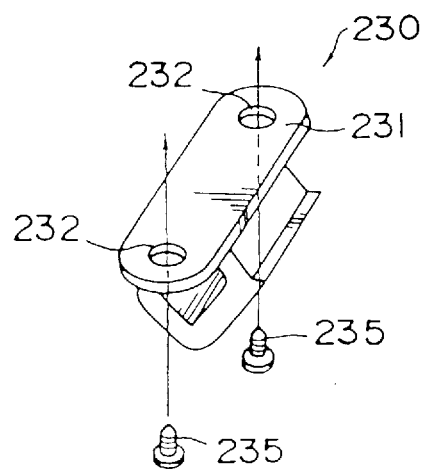
FIG. 14 is a perspective view showing a modification example of the fitting clip shown in FIG. 13.

FIGS. 13 and 14 show modification examples of the fitting-use clip piece, respectively. The clip piece 220 of FIG. 13, which is of such a type that the clip piece 210 is extended in a longitudinal direction of the spoke, has a cylindrical elastic engaging portion 223 on the lower surface of a slender base 221, where two engaging portions 222 formed with a spacing therebetween are provided on the upper surface of the base 221. Each of the engaging portions 222, which are rod-shaped projecting members, has a plurality of elastic fins formed with a spacing therebetween on the surface. When the engaging portions 222 are press-fitted into the holes 206a of the bosses, the engaging portions 222 are elastically engaged with the bosses. The elastic engaging portion 223 also has an engaging surface 224 to be engaged with the rear surface 62 of the spoke.

A clip piece 230 as shown in FIG. 14 is so formed that screws 235 as a separate member are employed instead of the engaging portions 222 of the clip piece of FIG. 13. Holes 232 through which the screws 235 are passed are formed near both ends of a base 231 of the clip piece 230, respectively.

The fitting operation of the cover to the aluminum body part 1 is carried out in the same way as in the concrete example shown in FIGS. 7 and 8.

In the examples described with FIGS. 7 to 14, the fixing means of the cover body can engage without any machining process on the spokes 6 of the aluminum body part.

Figure 15:
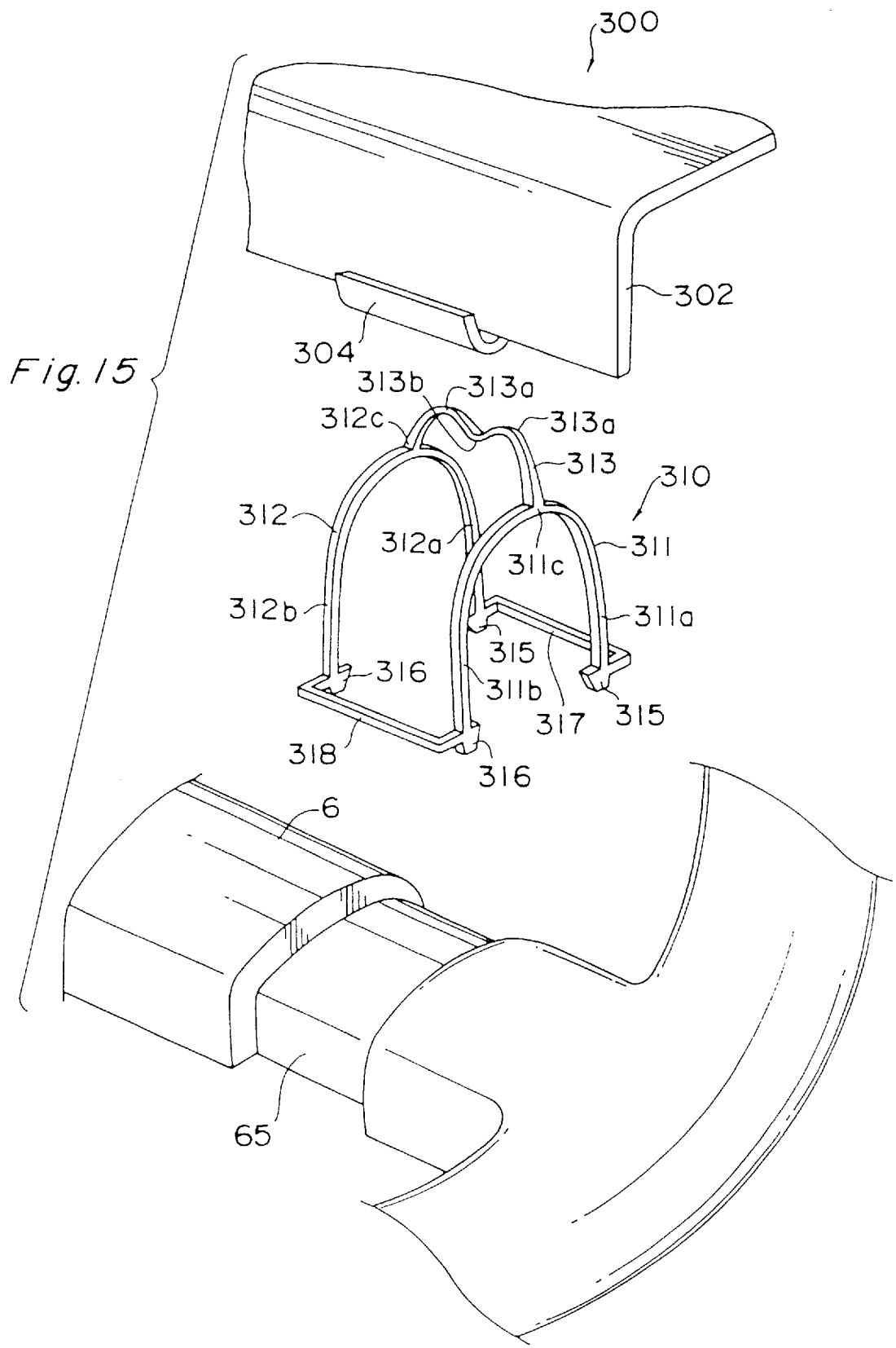
FIG. 15 is an explanatory view for explaining a case where a saddle-like fitting member made of wire material is employed as the fixing means.
Figure 16:
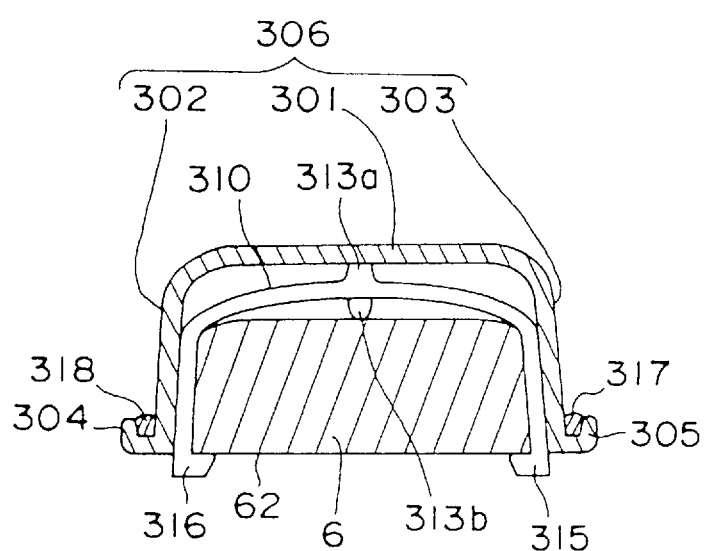
FIG. 16 is a cross-sectional view, corresponding to FIG. 8, for explaining a case where the saddle-like fitting member shown in FIG. 15 is employed.

In the example shown in FIGS. 15 and 16, a cover body 300 is similar to the cover body 10 of the sporty type shown in FIG. 3. FIG. 16 is a cross-sectional view corresponding to FIG. 8. FIG. 15 is an explanatory view showing a correlation among the cover body 300, a saddle-like fitting member 310 as fixing means, and the spoke 6 of the aluminum body part 1.

A spoke 306 of the cover body 300 comprises a top wall 301, and left and right side walls 302 and 303 hanging down from both sides of the top wall 301. That is, the spoke 306 is formed into a general U-shape in cross section that is bent so as to cover the top surface and both side surfaces of the spoke 6 of the aluminum body part 1. Engaging blades 304 and 305 are formed so as to be folded back from the ends of end portions of the side surfaces 302 and 303. These engaging blades are to engage the saddle-like fitting member 310, which will be detailed below.

The saddle-like fitting member 310, which is a member wholly made of a plurality of wire materials, is placed along the inner surface of the spoke that is bent into a general U-shape, and is fixed to the engaging blades 304, 305. The saddle-like fitting member 310 is wholly made of plastic resin, and has first and second U-shaped wire materials 311, 312, a W-shaped wire material 313, and first and second linear hooking wire materials 317, 318.

The first and second U-shaped wire materials 311, 312 have respectively two legs 311a, 311b and 312a, 312b, and extend in parallel to each other along the top surface and both side surfaces of the spoke 6. At ends of their respective legs, are formed hooks 315, 316 which are to be engaged with the rear surface 62 of the spoke.

The W-shaped wire material 313 has two valley parts 313a and one summit part 313b, and couples portions 311c, 312c, of the U-shaped wire materials, corresponding to the center of the top surface of the spoke (i.e., portions that couple both legs in the respective U-shaped wire materials) with each other.

The first and second linear hooking wire materials 317, 318 couple portions of the respective U-shaped wire materials near the ends of both legs with each other, while they are engaged with the engaging blades 304, 305 formed on the side walls 302, 302 constituting the spoke of the cover body.

The saddle-like fitting member 310 is attached to the cover body 300 by its first and second linear hooking wire materials 317, 318 being engaged with the engaging blades 304, 305.

In the fitted state as shown in FIG. 16, the W-shaped wire material is compressed and pinched between the cover body and the spoke 6 with its valleys 313a and summit 313b being kept in elastic press contact with the rear surface of the top wall 301 and the top surface of the spoke, respectively, so that the W-shaped wire material presses and urges the spoke 6 downward as viewed in FIG. 16. Meanwhile, the hooks 315, 316 of the U-shaped wire materials support the spoke against this elastic force from the opposite side, by which the cover body 300 is fixed to the aluminum body part 1.

On the top surface and both side surfaces of the spoke 6, a recess 65 for positioning the saddle-like fitting member 310 is formed. This recess is an optional element and so may be omitted.

The fitting operation of the cover to the aluminum body part 1 is carried out in the same way as in the concrete example shown in FIGS. 7 and 8.

Figure 17:
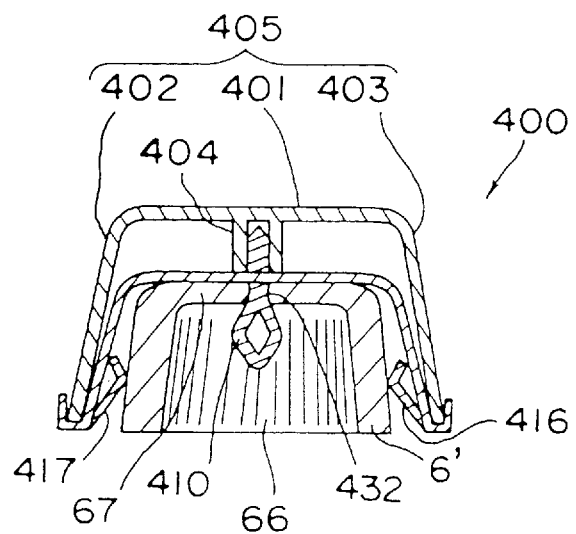
FIG. 17 is a cross-sectional view, corresponding to FIG. 8, for explaining a case where a clip member is employed as the fixing means.
Figure 18:
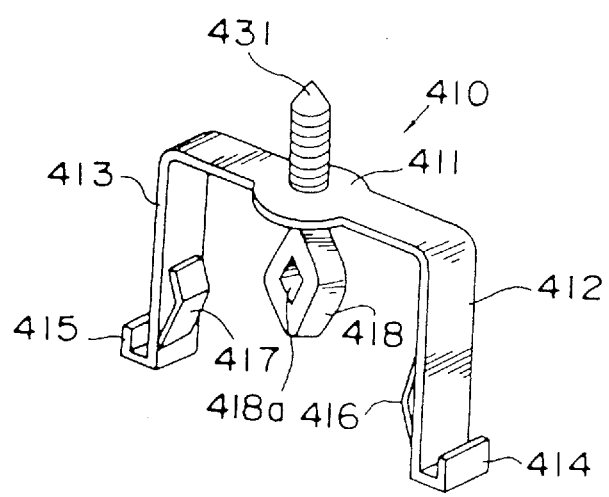
FIG. 18 is a perspective view showing the clip member shown in FIG. 17.

In the example shown in FIGS. 17 and 18, a cover body 400 is similar to the cover body 10 of the sporty type shown in FIG. 3. FIG. 17 is a cross-sectional view corresponding to FIG. 8. FIG. 18 is a perspective view showing the clip member shown in FIG. 17.

A spoke 405 of the cover body 400 comprises a top wall 401 and left and right side walls 402 and 403 hanging down from both sides of the top wall 401. That is, the spoke 406 is formed into a general U-shape in cross section that is bent so as to cover the top surface and both side surfaces of the spoke 6' of the aluminum body part 1. A boss 404 extending downward from the rear surface of the top wall 401 is formed. Into a hole formed in this boss 404, a boss engaging portion 415 of a clip member 410, which will be detailed below, is press-fitted.

Also in this example, a recess 66 is formed on the rear surface of the spoke 6' of the aluminum body part 1. Then, at a thin-wall-thickness portion 67 of the spoke which results from the formation of the recess, a through hole 432 pierced axially of the wheel is formed. A through-hole engaging portion 418 of the clip member 410, which will be detailed below, is passed through the through hole 432.

The clip member 410, as shown in FIG. 18, has a boss engaging portion 431 and the through-hole engaging portion 418 provided on both sides of a circular base 411, respectively, while a pair of legs 412 and 413 extending outward from the base 411 are formed. The legs 412, 413 extend in opposite directions relative to each other and are bent downward, thus extending along the top surface and side surfaces of the spoke 6' as shown in FIG. 17. At ends of the legs, hooks 414, 415 are formed by folding back the end portions. Further, on the surfaces of the legs opposite to the side surfaces of the spoke 6', press-contact pieces extending up to the side surfaces are provided.

The clip member 410 is attached to the cover body by press-fitting and engaging its boss engaging portion 431 into the hole of the boss 404 provided on the rear surface of the top wall 401 of the spoke. The boss engaging portion 431, which is a rod-shaped projecting member, has a plurality of elastic fins formed with a spacing therebetween on the surface. When the boss engaging portion 431 is press-fitted into the hole of the boss 404, the boss engaging portion is elastically engaged with the boss. Meanwhile, the through-hole engaging portion 418, which is a generally rhombus-shaped ring member made of plastic resin, is normally larger in diameter than the through hole 432 but is elastically deformed into a nearly linear shape in such a way as if a through-hole portion 418a of the ring member were collapsed. Thus, the through-hole engaging portion 418 is allowed to pass through the through hole 432 formed in the spoke 6'.

In the fitted state shown in FIG. 17, the clip member 410 is engaged with the boss 404, which is provided on the rear surface of the top wall of the spoke, and the through hole 432 of the spoke 6' of the aluminum body part 1, and thereby couples the two with each other so that the clip member 410 prohibits the cover body 400 and the spoke 6' from relatively moving axially of the wheel. Meanwhile, press-contact pieces 416 and 417 provided on both legs of the clip member are brought into press contact with the side surfaces of the spoke from both sides, thereby elastically pinching the spoke 6' to prevent the cover body 400 and the spoke from relatively moving radially of the wheel. As a result of the above, the cover body 400 is fixed to the aluminum body part 1.

The actual fitting operation of the cover to the aluminum body part 1 is carried out in the following way. First, the boss engaging portion 431 of the clip member 410 is press-fitted into the hole of the boss 404 provided on the rear surface of the top wall of the spoke, by which the cover body and the clip member are connected together, thus making up the cover. In this process, adjustment is made so that the hooks 414 and 415 provided at the ends of both legs of the clip member 410 are engaged with the end portions of the side walls 402 and 403 of the spoke 405, respectively. Next, the cover is pressed against the aluminum body part 1 from above. Then, the through-hole engaging portion 418 that is elastically deformed is passed through the through hole 432, and its shape is restored. The resulting state is as shown in FIG. 17. By the operation reverse to the above operation, the cover can be removed from the aluminum body part 1.

Figure 19:
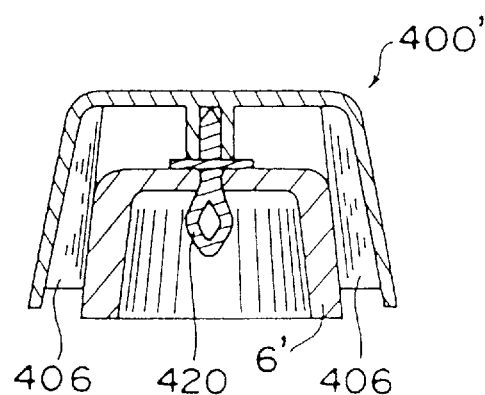
FIG. 19 is a cross-sectional view, corresponding to FIG. 8, for explaining a case where another clip member is employed as the fixing means.
Figure 20:
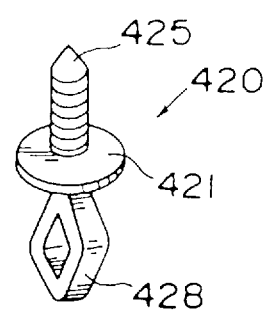
FIG. 20 is a perspective view showing the clip member shown in FIG. 19.

A modification example of the cover shown in FIGS. 17 and 18 is shown in FIGS. 19 and 20. FIGS. 19 and 20 correspond to FIGS. 17 and 18, respectively.

A cover body 400' shown in FIG. 19 comprises, relative to the cover body 400 of FIG. 17, positioning ribs 406 extending from the rear surfaces of both side walls up to the side surfaces of the spoke 6'. These positioning ribs 406, like the legs 412, 413 provided in the clip member of FIG. 18, has a positioning function in the radial direction of the wheel. That is, in the fitted state as shown in FIG. 19, the positioning ribs 406 that extend from both side walls of the spoke and make contact with the side surfaces of the spoke 6', prohibit the cover body 400' and the spoke from relatively moving in the radial direction of the wheel. The rest of the arrangement is the same as that shown in FIG. 17.

As seen above, in this cover body 400', the positioning ribs 406 fulfill the function equivalent to the legs of the clip member 410 of FIG. 18. Thus, a clip member 420 used for this cover body 400' does not have such legs 412, 413 as provided to the clip member 410.

The clip member 420, as shown in FIG. 20, has a screw portion 425 and a through-hole engaging portion 428 provided on both sides of a circular base 421, respectively. The through-hole engaging portion 428 is similar to that provided in the clip member 410. The clip member 420 is attached to the cover body by its screw portion 425 being screw-fitted to the hole of the boss 404 provided on the rear surface of the top wall of the spoke.

Figure 21:
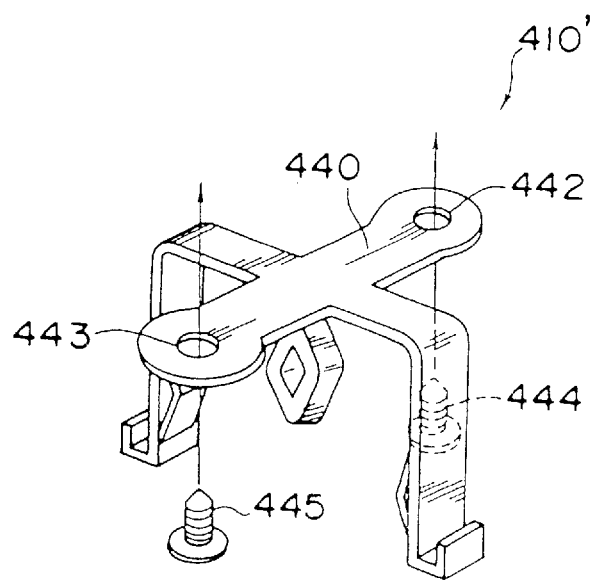
FIG. 21 is a perspective view showing a modification example of the clip member of FIG. 18.

FIG. 21 shows a clip member 410', which is a modification example of the clip member 410 shown in FIG. 18. The clip member 410' employs two screws 444 and 445 instead of the boss engaging portion 415. Responsive to this, a slender base 440 is adopted in place of the circular base 411 of the clip member 410, and holes 442 and 443 for passing the screws 444 and 445 therethrough are formed near both end portions of the base 440. It is to be noted that the slender base 440 extends perpendicularly to the direction in which both legs 412 and 413 extend. The rest of the arrangement of the clip member 410' is the same as that of the clip member 410 shown in FIG. 18.

Figure 22:
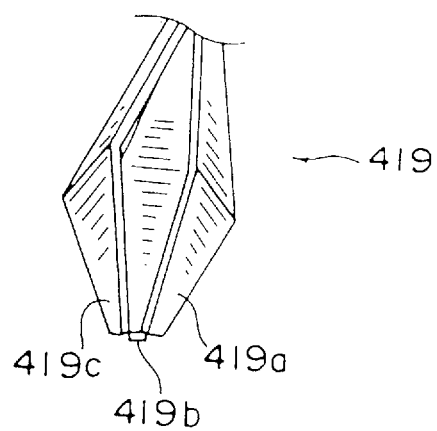
FIG. 22 is an explanatory view showing a modification example of the through-hole engaging portion of the clip members shown in FIGS. 17 to 21.

FIG. 22 shows a modification example of the through-hole engaging portions adopted in the clip members 410, 420, 410' shown in FIGS. 17 to 21. Whereas the aforementioned through-hole engaging portions have been elastically deformable, generally rhombus-shaped ring members made of plastic resin, the through-hole engaging portion 419 shown in FIG. 22 comprises three bent metal plates 419*a* to 419*c* arrayed as if it were a bud. By the metal plates being elastically deformed, the through-hole engaging portion 419 can fulfill a function equivalent to the through-hole engaging portion of plastic resin.

Figure 23:
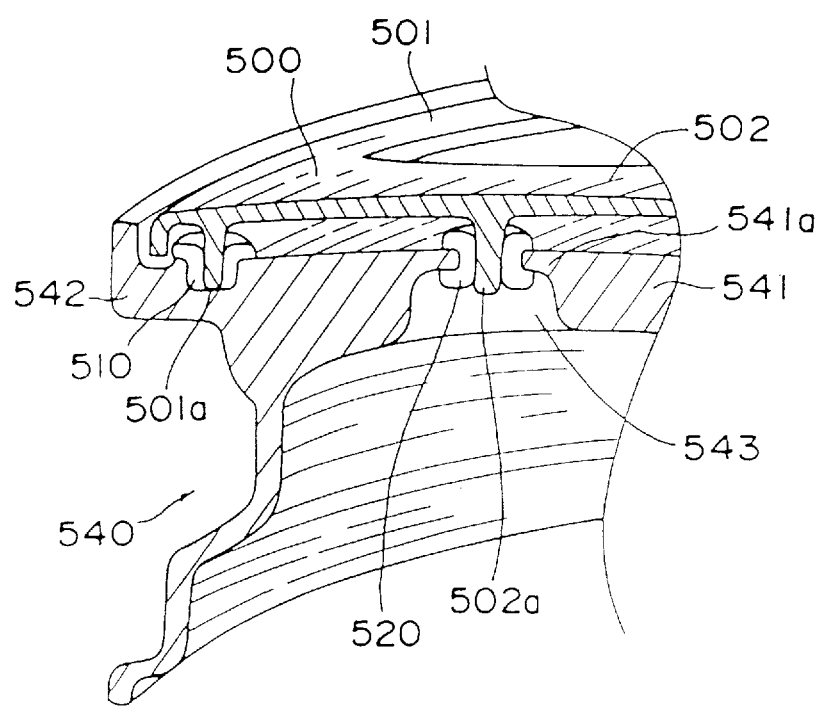
FIG. 23 is a partial sectional perspective view showing a state in which the cover and the aluminum body part are fitted to each other, in case that an elastic bushing is employed as the fixing means.
Figure 24:
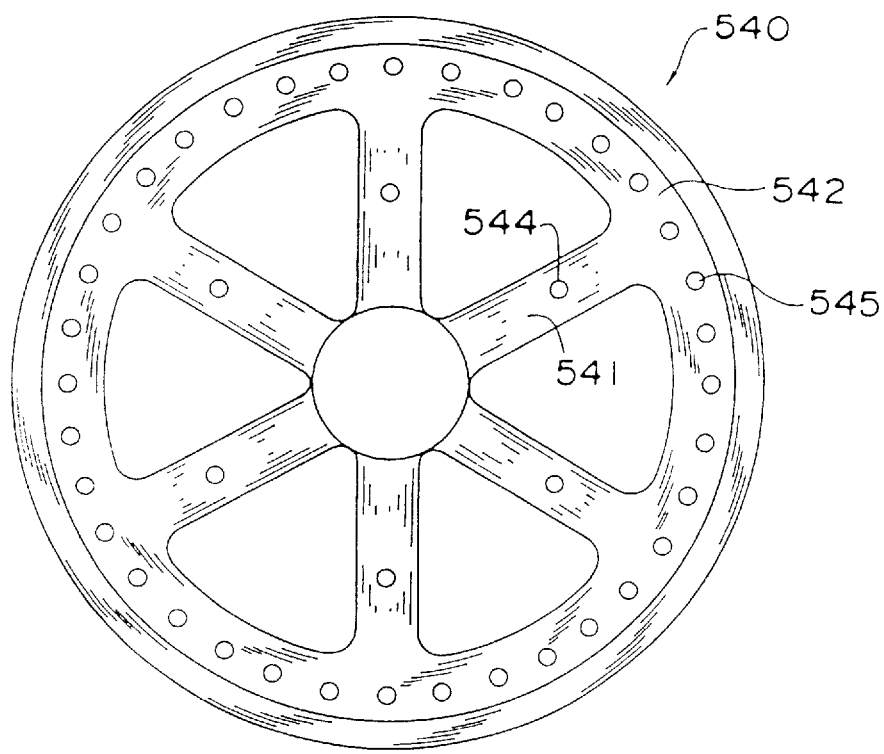
FIG. 24 is a front view of the aluminum body part shown in FIG. 23.

In the example shown in FIG. 23, a cover body 500 is similar to the cover body 10 of the sporty type shown in FIG. 3. However, its spoke 502 is constituted not by a top wall and both side walls as described above, but by a slender flat plate. FIG. 24 shows a front view of an aluminum body part 540 shown in FIG. 23.

A spoke 541 of the aluminum body part 540 has a through hole 544 pierced therethrough axially of the wheel, while a rim 542 has a plurality of holes 545 formed along its circumference.

As can be seen from FIG. 23, a recess 543 is formed on the rear side of the spoke 541. At a thin-wall portion 541*a* which results from the formation of this recess 543, the through hole 544 is formed. Into this through hole, an elastic bushing 520 which will be detailed later is inserted. In the rim 542, on the other hand, the holes 545, which are not through holes but bottomed holes, are formed in order to prevent the rim from lowering in strength. To these holes 545, similar elastic bushings 510 are inserted.

The cover body 500 has the spoke 502 and the rim 501 corresponding to the spoke 541 and the rim 542 of the aluminum body part, respectively. And, a protrusion 502*a* is formed at a position on the rear surface side of the spoke 502 corresponding to the through hole 544, while a protrusion 501*a* is formed at positions on the rear surface side of the rim 501 corresponding to the holes 545. Elastic bushings to be externally fitted to these protrusions constitute the fixing means for removably fixing the cover to the aluminum body part 540. That is, the elastic bushings 510, 520 are compressed and pinched between the holes 545 or through holes 544, and the protrusions 501*a*, 502*a*, respectively, so that the cover body 500 is fixed to the aluminum body part 1.

Figure 25:
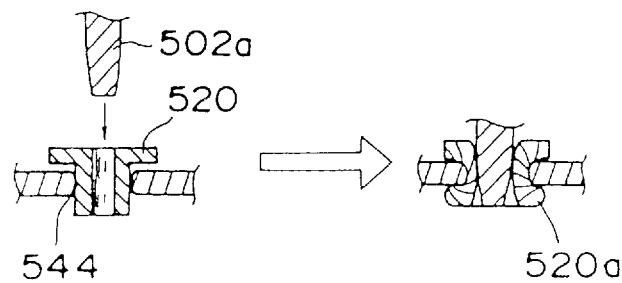
FIG. 25 is an explanatory view for explaining the function of the elastic bushing shown in FIG. 23.

FIG. 25 is an explanatory view showing the function of the elastic bushing 520 which is compressed and pinched between the through hole 544 formed in the spoke 541, and the protrusion 502*a*. More specifically, the outer diameter of the part of the bushing 520 that is inserted into the through hole 544 is, in normal state, nearly equal to the inner diameter of the through hole 544. Accordingly, the bushing 520 can be easily engaged with the through hole 544. On the other hand, the outer diameter of the protrusion 502*a* is larger than the inner diameter of the normal-state bushing 520. Accordingly, when the protrusion 502*a* is press-fitted into the bushing 520 that is engaged with the through hole 544, the bushing 520 is elastically so deformed that its end portion 520*a* swells outward. Therefore, even when the protrusion 502*a* has undergone a force acting in such a direction as to be pulled out from the bushing 520, this swollen end portion 520*a* exerts some degree of resistive force (i.e., holding force). In addition, the protrusion 502*a* is tapered for convenience of the press-fitting into the bushing. This is also the case with the protrusion 501*a*.

Since the holes formed in the rim 542 of the aluminum body part 540 have the bottoms, the elastic bushings 510 inserted thereinto do not perform the function as described with reference to FIG. 25, but still can exert some degree of holding force by virtue of the elastic force of the bushings. That is, although both the bushings 520 to be inserted into the through holes 544 and the bushings 510 to be inserted into the holes 545 exert such holding force as to hold the cover body to the aluminum body part, the bushings 520 to be inserted into the through holes exert the larger force while the bushings 510 to be inserted into the holes rather play a major role as a positioning element.

However, as in the case shown in FIG. 24, when the holes 545 are formed more than the through holes 544, it is possible that even if the holding force due to the bushing 510 to be inserted into the holes is smaller than the holding force due to the bushing 520 to be inserted into the through holes, the holding force due to the bushings 510 is, as a whole, made equivalent to or greater than the holding force due to the bushings 520.

In the example described in FIGS. 23 to 25, the through holes and the holes formed in the aluminum body part fulfill some degree of ornamental effect (particularly, see FIG. 24). That is, even if the cover that serves as the design part is omitted from the aluminum body part, the design property will not significantly deteriorate, advantageously.

Although the present invention has been fully described on its preferred embodiments with reference to the accompanying drawings, it is to be noted that various changes and modifications will be apparent to those skilled in the art. Therefore, unless such changes and modifications depart from the scope of the present invention as defined by the appended claims, they should be construed as included therein.

What is claimed is:

1. An aluminum wheel for an automobile, comprising:

an aluminum body part which has a rim part and a disc part and which gives the aluminum wheel a predetermined strength;

a cover which has a substantially disc-shaped cover body that serves as a design part covering a front face of the aluminum body part and which has a plurality of fixing means that are provided on a rear surface of the cover body in a circumferential direction thereof with a spacing between the fixing means so that the cover body is removably attached to the aluminum body part, the disc part of the aluminum body part includes a plurality of spokes which extend radially, each of the plurality of fixing means includes an elastic member which is pinched in a compressed state between the rear surface of the cover body and a surface of the spoke and a pair of fitting clip pieces which support the spoke against elastic force by the elastic member from its opposite side; and each of the clip pieces includes a pinching part for elastically pinching a part of the cover body and an engaging part which extends in an axial direction of the wheel and which has an elastic engaging projection, each of the spokes is pinched in three directions by the elastic member and the elastic engaging projections of the clip pieces so that the cover body is fixed to the aluminum body part.

2. The aluminum wheel for the automobile according to claim 1, wherein the pinching part of the clip piece has a positioning piece which is engaged with a part of the cover body so as to prevent the clip piece from deviating in a longitudinal direction of the spoke.

3. The aluminum wheel for the automobile according to claim 2, wherein the cover body is made of plastic resin.

4. The aluminum wheel for the automobile according to claim 1, wherein the cover body is made of plastic resin.

5. The aluminum wheel for the automobile according to claim 1, wherein the cover body is made of plastic resin.

* * * * *